March 25, 1930.    R. MAYNE    1,751,869
VULCANIZING APPARATUS
Filed Dec. 22, 1928    4 Sheets-Sheet 1
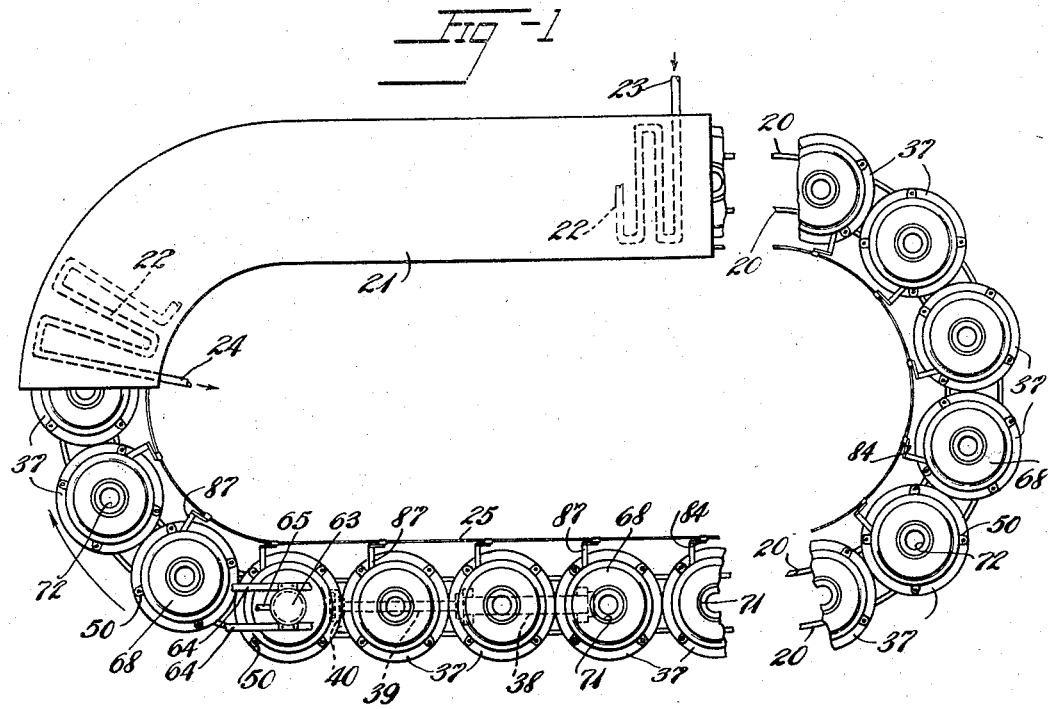
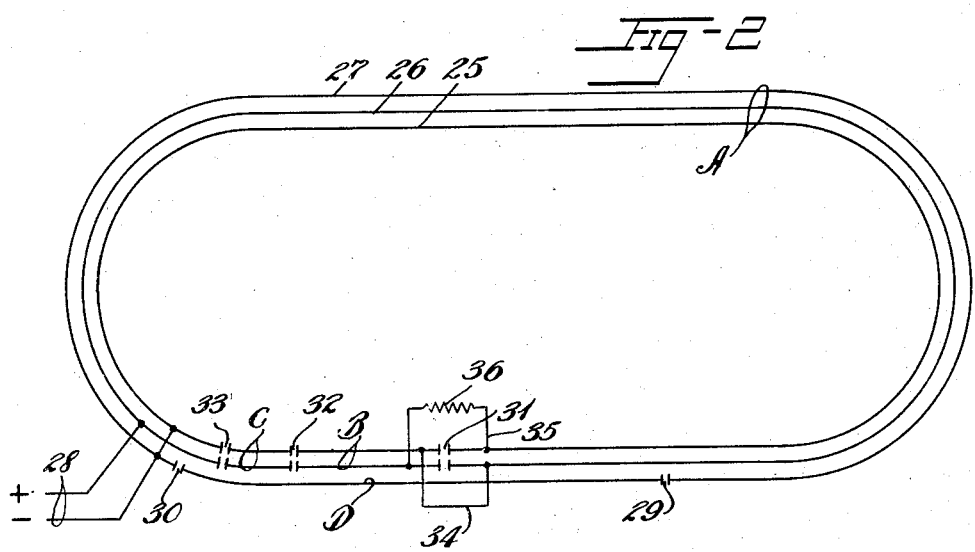
Inventor
Robert Mayne
By Eakin & Avery Attys March 25, 1930.  R. MAYNE  1,751,869
VULCANIZING APPARATUS
Filed Dec. 22, 1928     4 Sheets-Sheet 2
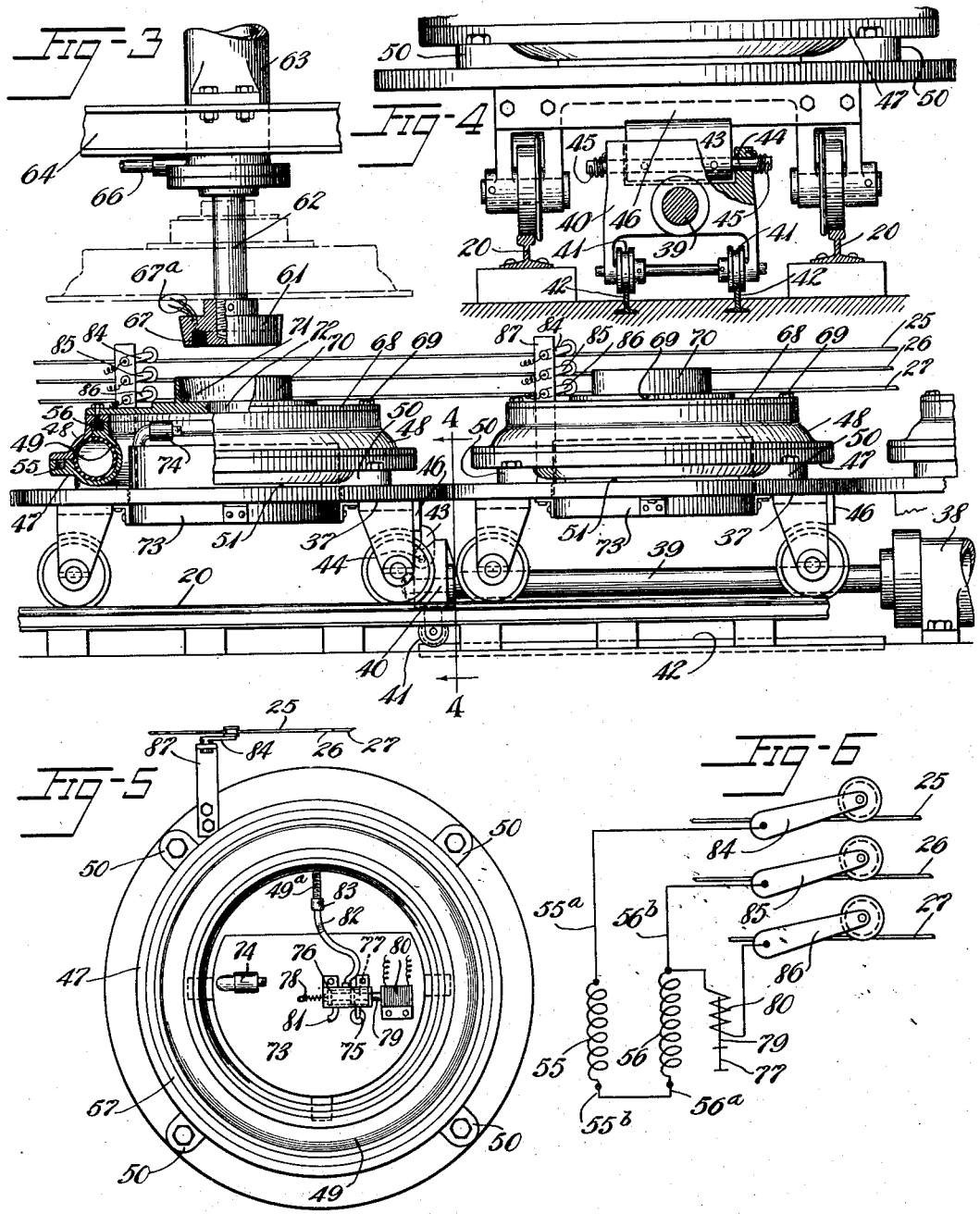
Inventor
Robert Mayne
By Eakin & Avery Attys

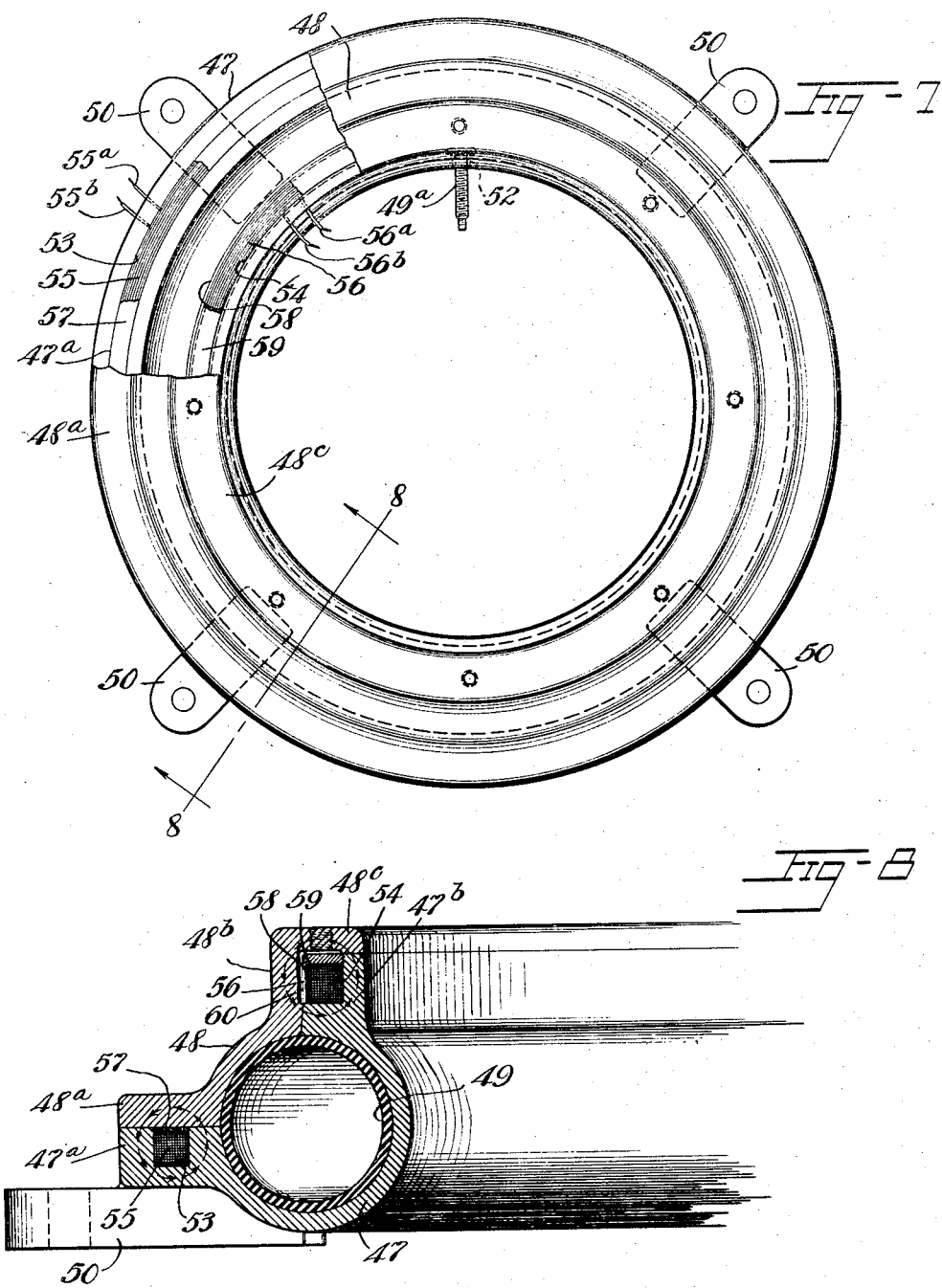

March 25, 1930. R. MAYNE 1,751,869
VULCANIZING APPARATUS
Filed Dec. 22, 1928 4 Sheets-Sheet 4
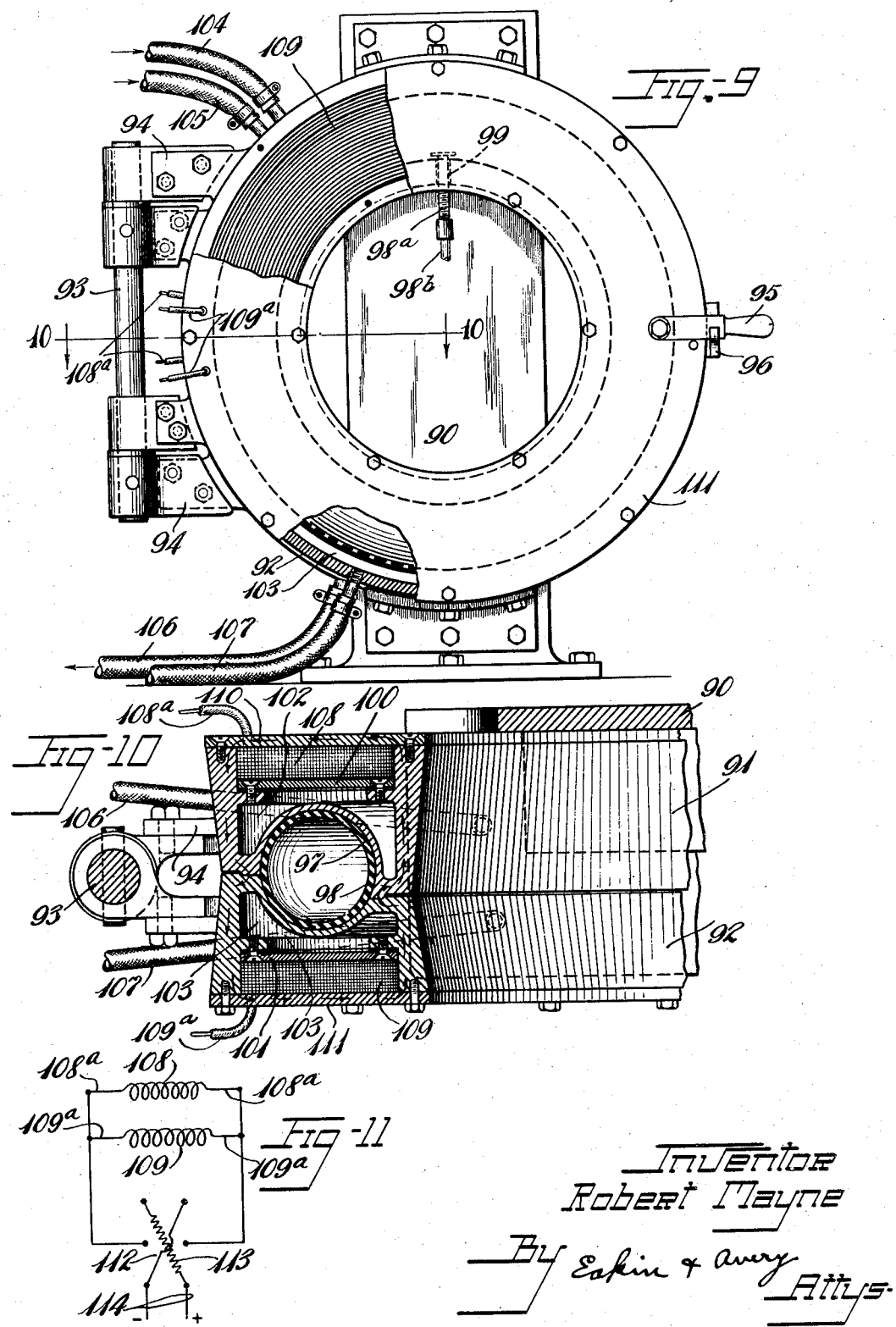

Patented Mar. 25, 1930

1,751,869

UNITED STATES PATENT OFFICE

ROBERT MAYNE, OF AKRON, OHIO, ASSIGNOR TO THE B. F. GOODRICH COMPANY, OF NEW YORK, N. Y., A CORPORATION OF NEW YORK

VULCANIZING APPARATUS

Application filed December 22, 1928. Serial No. 328,016.

This invention relates to sectional molds such as commonly are used for vulcanizing pneumatic tires or inner tubes, and to means and methods for holding the sections thereof together in mated relation.

Among the chief objects of my invention are to provide for holding the mold-sections together without the use of mechanical clamping means; to provide economy of time in the vulcanizing operation; to provide in an improved manner for rapidly bringing to vulcanizing temperature an article to be vulcanized; and to provide for rapidly cooling the same after vulcanization has been completed.

Of the accompanying drawings:

Fig. 1 is a plan view of a vulcanizer, an endless trackway passing therethrough and a plurality of my improved sectional molds on said trackway.

Fig. 2 is a diagram of electrical wiring used in connection with said trackway for conducting electrical current to the molds thereon.

Fig. 3 is a side elevation, on a larger scale, of two of the mold assemblies, means for opening and closing the molds, means for impelling the same through the vulcanizer, and the work within one of the molds, parts being in section and broken away.

Fig. 4 is a section on line 4—4 of Fig. 3.

Fig. 5 is a plan view of one of the mold sections, the cover being removed therefrom.

Fig. 6 is a diagram of the electrical wiring of a mold assembly.

Fig. 7 is a plan view of a mold assembly, parts being broken away for clearness of illustration.

Fig. 8 is a section on line 8—8 of Fig. 7.

Fig. 9 is a front elevation of a watch-case vulcanizer comprising a modification of my invention.

Fig. 10 is a section on line 10—10 of Fig. 9.

Fig. 11 is a wiring diagram of the electric wiring associated with the modified apparatus.

Referring first to Figs. 1 to 8 of the drawings, 20, 20 are track-rails which constitute an endless trackway which at one portion of its course traverses the length of a chamber or vulcanizer 21, the interior of which is heated to vulcanizing temperature, as by the coils of steam pipes 22 therein, said coils being provided with the usual steam-inlet 23 and steam outlet 24.

Paralleling said trackway, preferably at one side thereof, are three power-conductor wires 25, 26, 27, (Fig. 2) connected to the power leads 28, the wire 26 carrying positive current and the wires 25, 27 carrying negative current. Breaks 29, 30 are interposed in the conductor wire 27 and breaks 31, 32, and 33 are interposed in the conductor wires 25, 26 as shown, connections 34, 35 being jumped across the break 31 to reverse the current posterior thereto. A resistance coil 36 is interposed in the connection 35 to reduce the current flowing past the break. The result is that the three conductors 25, 26, 27 have a relatively long live zone A, the conductors 25, 26 have a relatively short zone of reduced and reversed current B, and a shorter dead zone C, and the conductor 27 has a dead zone D of substantial length between the breaks 29, 30. All of said breaks are positioned at that region of the trackway where molds are to be opened and closed to permit removal of finished work from the molds and the replacement thereof with unvulcanized material.

Mounted upon the rails 20 are a plurality of wheeled trucks or carrriages 37, 37 which are circular in plan and which completely fill the trackway, the respective carriages tangentially abutting adjacent carriages at their front and rear so that the propulsion of one carriage will propel the entire series.

For so propelling the carriages 37, a fluid pressure operated cylinder 38 is mounted between and parallel to the rails 20 and below the carriages 37, the piston rod 39 of said cylinder being provided on its outer end with a cross-head 40 which is provided with grooved wheels 41, 41 resting upon respective rails 42, 42. The upper portion of the cross-head 40 is cut away in front to provide a recess for a pawl 43 which is mounted upon a shaft 44, the end portions of the latter extending through the side walls of the cross-head structure and being provided exteriorly thereof with torsion springs 45, 45 so secured to said shaft and cross-head as normally to urge said pawl against the rear wall of its recess. The stroke of the cylinder 38 is substantially the length of one carriage 37 and the arrangement is such that in the outward or forward stroke of the piston rod 39 the pawl 43 engages a downwardly extending plate 46 of the frame of a carriage 37 and thereby impells said carriage and the entire series of carriages forward along the trackway. On the reverse or backward stroke of the piston-rod the pawl 43 because of its pivotal mounting, passes under the extension 46 of the succeeding carriage 37 and thus attains a position wherein it is adapted to engage said extension on the next forward stroke of the piston rod.

Mounted upon the respective carriages 37 are sectional molds each of which comprises a base-section 47 and a cover-section 48. For the purpose of illustration I have shown my invention applied to molds for vulcanizing annular articles, such as the inner tube 49 of vulcanizable rubber mounted therein. The mold-sections 47, 48 are annular in form and made of suitable magnetic material, preferably cast steel. The walls of the sections preferably are relatively thin to permit the rapid transfer of heat to the interior of the molds and to effect rapid cooling of the latter, such thinness being permissible since the mold sections are held together by magnetic force acting upon substantially all of the material thereof with approximate uniformity. The base-sections 47 are formed with integral feet 50, 50 which are bolted to the carriages 37, and which support the molds somewhat above the top of the respective carriages to provide a space 51 therebetween for the passage of heating fluid. The base-section 47 is formed on its inner periphery with a radial aperture 52 adapted freely to accommodate the valve stem 49$^a$ of an inner tube 49 when the latter is in the molding cavity of the mold.

The base-section 47 and cover-section 48 of each mold mate with each other along respective integral flange portion 47$^a$, 47$^b$, 48$^a$, 48$^b$. The flange portions 47$^a$, 48$^a$ are disposed at the outer periphery of the mold and their meeting plane is substantially at the medial plane of the mold. The flange portions 47$^b$, 48$^b$ are disposed circumferentially of the mold at the top thereof, their meeting plane preferably being somewhat inclined from the vertical to permit easy removal and mounting of the cover section 48. A radial extension 48$^c$ on the flange 48$^b$ overlies the upper margin of the flange 47$^b$ for a purpose subsequently explained.

The arrangement is such that the base-section 47 constitutes more than half of the cross-section of the mold-assembly, the cover-section 48 being correspondingly less than half the cross-section thereof.

The flanges 47$^a$, 47$^b$ are somewhat thicker than the flanges 48$^a$, 48$^b$, and an annular medial groove 53 is formed in the top face of the flange 47$^a$. An annular groove 54 of similar cross-sectional area is formed in the flange 47$^b$ at the junction of its top and outer peripheral face. Each of the respective annular grooves 53, 54 has mounted therein an annular series of coal-windings 55, 56, the ends of the coils 55$^a$, 55$^b$, 56$^a$, 56$^b$ (Fig. 7), extending through the flange walls and being connected, in a manner subsequently described, to a suitable source of electric current.

The coil 55 is sealed in its groove 53 by an annular plate 57 of brass or similar non-magnetic material disposed flush with the face of the flange 47$^a$ and secured in place by peening or the like. The coil 56 is similarly sealed in its groove 56 by an annular sleeve 58 and an annular plate 59 which enclose respectively the outer peripheral face and the top face of the coil. The face of the flange 48$^b$ and its radial extension 48$^c$ are recessed, as shown at 60, adjacent the coil 56 to avoid wear of the protective members 58, 59 from contact with said flange members.

The arrangement is such that when the mold sections are in assembled relation and electric current is caused to flow through the coils 55, 56, a magnetic flux is induced by each of the coils. Each of the fluxes so induced flows in a circular course about the respective coil that induces it, through the adjacent flanges 47$^a$, 48$^a$, or 47$^b$, 48$^b$ of the mold sections, which in consequence are firmly held together magnetically.

At a suitable point in the course of the molds, preferably adjacent the entrance to the vulcanizer 21, the cover-sections 48 of the successive molds are lifted from the base-sections 47 to permit the removal of the vulcanized article and the replacement thereof with an unvulcanized article. Although the cover-sections may be so lifted by manual or mechanical means, I prefer to use the combined magnetic and mechanical apparatus shown in Fig. 3 wherein 61 is a frusto-conical head mounted upon the free end of the downwardly-extending piston-rod 62 of a vertically disposed double-acting fluid-pressure cylinder 63. The latter is mounted upon suitable supports such as beams 64, 64 positioned centrally over the carriage trackway, and the cylinder 63 is so positioned on said beams as to be substantially coaxial with respective mold assemblies as they are successively presented at the cover-lifting station by the carriage-propelling means hereinbefore described. The cylinder 63 is provided at its opposite ends with the usual fluid inlet and outlet pipes 65, 66 which are connected to the usual fluid-supply valves (not shown). The frusto-conical head 61 is formed in its bottom face with a concentric recess or groove in which is seated and sealed an annular series of coil windings 67, the ends 67ª of the coil extending through the wall of the head to the top face thereof and being connected to any suitable source of electric current (not shown).

For cooperation with the head 61 when the latter is lowered to engage the cover-section 48 of a mold, said cover section is provided with a top-plate 68 which is secured to the radial flange portion 48ᶜ of said cover-section by bolts or the like 69, 69, and which is formed on its upper side with an axial boss 70 having therein a recess 71, of size and shape complemental to the head 61, extending downwardly from its top face. An axial aperture 72 formed in the top-plate 68 permits the circulation of heating fluid around the mold, which fluid enters the space defined by the mold through the passage 51 between the mold and carriage 37.

The arrangement is such that when the head 61 is lowered and seated in the recess 71, and electric current passed through the coil 67, magnetic flux is induced by the coil and flows in a circular course about the same through the adjacent metal walls of the head 61 and boss 70, with the result that said head and boss are held firmly together magnetically.

In the vulcanization of hollow rubber articles such as inner tubes, it is desirable that the article be under internal pressure sufficient to force its walls outwardly against the walls of the mold. For the purpose of supplying fluid pressure to the interior of the article I mount a generally cylindrical tank or receptacle 73 upon each carriage 37 within the space defined by the mold thereon, said tank being of such shape at its front side as to permit free access to the valve stem 49ª of an inner tube within the mold. The tank 73 is of sufficiently rugged construction to withstand substantial internal pressure, and it is provided with a large, valved inlet-port 74 through which it may be filled quickly with gaseous fluid under pressure.

The outlet port 75 of the tank communicates with a piston-valve 76 (Fig. 5) mounted on the tank, the piston-rod 77 of the valve being connected at one end to a tension-spring 78 and at its other end to the core 79 of a solenoid 80. The valve 76 also is provided with an exhaust port 81, and with a delivery port which is provided with a flexible connection 82 having on its free end a quickly attachable and detachable coupling 83 adapted for engagement with a valve-stem 49ª of an inner tube. The arrangement is such that when the solenoid 80 is de-energized the spring 78 moves the piston-rod 77 of the valve 76 to a position which closes the valve inlet and puts its delivery port in communication with its exhaust port 81. When the solenoid 80 is energized, the piston is drawn in reverse direction against the pull of the spring 78 and puts the valve's inlet port in communication with its delivery port, and closes off the latter from the exhaust port 81.

The electrical mechanism of the individual carriages 37 comprising the coils 55, 56 and the solenoid 80 are supplied with electrical current from the conductor wires 25, 26, 27 respectively through trolleys 84, 85, and 86 which trolleys are pivotally mounted upon a suitable upright support 87 on the carriage and have their free ends provided with the usual trolley-wheels which travel upon the said conductor wires. As shown in the wiring diagram Fig. 6, the end 55ª of the coil 55 connects with the trolley 84, the end 55ᵇ of said coil is connected to the end 56ª of the coil 56, and the end 56ᵇ of the latter connects with the trolley 85. One end of the solenoid coil 80 connects with the trolley 86 and its other end connects with the trolley 85 through the end 56ᵇ of the coil 56.

The operation of the apparatus will be described beginning with a carriage 37 in position beneath the fluid pressure cylinder 63, the piston rod thereof raised, and a mold cover 48 lifted from the base-portion 47 of the mold and suspended, in the broken-line position shown in Fig. 3, from the magnetic head 61, the coil 67 in the latter being energized. The trolleys 84, 85 are on the dead zone C of the conductors 25, 26 and the trolley 86 is on the dead zone D of the conductor 27 so that the coils 55, 56 of the mold member 47 are de-energized, as also is the solenoid 80, and the spring 78 of the valve 76 holds the piston rod of the latter in the position to close the outlet port of the tank 73 and place the delivery port of the valve in communication with its exhaust port 81.

The operator mounts a partly-inflated unvulcanized inner tube 49 in the cavity of the mold-base 47 by inserting the valve stem 49ª of the tube through the aperture 52 in the mold wall, and then stretching the tube over the flange 47ᵇ of the mold to seat the tube in the cavity thereof. The coupling 83 of the flexible connection 82 is then attached to the valve-stem 49ª, and the tank 73 is filled with compressed fluid, such as air, to a determinate pressure, which pressure is of such magnitude that when the tank and inner tube subsequently are placed in free communication with each other the resulting balanced pressure in the tube and tank will be sufficient to hold the wall of the tube firmly against the wall of the molding cavity in which it is mounted. The mold sections at this position are fairly cool so there is no softening of those parts of the inner tube in contact with the mold-section 47 before the cover section 48 is placed thereon.

The lifting head 61 is then lowered to deposit the cover-section 48 on the base-section 47 of the mold, and the coil 67 is de-energized to release said head from magnetic engagement with said cover-section, after which the head is raised to an inoperative position above the mold, as shown in its full-line position in Fig. 3.

The cylinder 38 is then actuated to draw the cross-head 40 rearwardly until its pawl 43 passes beneath and beyond the downwardly-extending plate 46 of the succeeding carriage 37, after which the cylinder is reversed to move said cross-head forward, the pawl 43 engaging said plate 46 and the carriage being thereby propelled forward to the position beneath the head 61, and the entire series of carriages being moved forward a corresponding distance. The operations just described may then be repeated upon the mold now positioned in the mold-loading station.

As the newly loaded carriage is thus propelled from the mold-loading station, its trolleys 84, 85 pass the break 33 in the conductor wires 25, 26 and move onto the live zone A thereof, with the result that the coils 55, 56 of the mold-section 47 automatically are energized and magnetic flux is caused to flow in the flanges 47$^a$, 47$^b$, 48$^a$, 48$^b$ of the mold-sections 47, 48, the latter thereby being drawn together and firmly so held. At a slightly advanced position the trolley 86 passes the break 30 in the conductor wire 27 and moves onto the live zone A thereof with the result that the solenoid 80 is energized and the valve 76 thereby operated to put the delivery connection 82 thereof into communication with the outlet port 75 of the fluid-tank 73. This permits fluid from the latter to pass to the inner tube 49 to distend the same into firm contact with the wall of its mold.

This condition of the tube and mold is maintained while the carriage is advanced intermittently by the successive advancing of succeeding carriages. The mold is then carried into and through the constantly-heated vulcanizer 21, its time within the latter being of sufficient duration to insure the vulcanization of the tube. The orbit of the carriage trackway from the delivery end of the vulcanizer 21 back to the mold-loading station is of sufficient length to insure substantial cooling of the molds.

At a point reached by the mold considerably before it reaches the mold-loading station, the trolley 86 of the carriage 37 passes the break 29 in the conductor wire 27 and moves onto the dead zone D thereof, which causes the solenoid 80 to become de-energized with the result that the spring 78 reverses the valve 76 and thus permits the inner tube 49 slowly to deflate through the connection 82 and the exhaust port 81 of the valve. The outlet port 75 of the tank 73 is closed when the valve 75 is in this position.

Before reaching the mold-loading station the trolleys 84, 85 of the carriage 37 pass the break 31 and move onto the zone B of the conductor wires 25, 26 where the electrical current is of reduced magnitude and in reverse direction. The result is to terminate the flow of magnetic flux in the mold flanges and quickly to dissipate any residual magnetism therein.

Further advance of the carriage 37 causes the trolleys 84, 85 to pass the break 32 and move onto the dead zone C of the conductors 25, 26, at the mold-loading station. The head 61 is then lowered into the recess 71 of the plate 68 on the cover-section 48, the coil 67 in said head energized to hold said head and plate together magnetically, and the head then raised to lift the mold-section 48 from the mold-section 47. The vulcanized tube 49 is then removed from the mold and the operations described may be repeated.

In the modification shown in Figs. 9 and 10 I show my invention applied to a watch-case vulcanizer comprising an upright support 90 upon which is mounted the stationary section 91 of a pair of annular, mating, channeled mold sections 91, 92, the movable section 92 of which is pivotally mounted upon a hinge-pin 93 carried by brackets 94, 94 secured to the stationary section 91. The mold sections are composed of cast-iron, steel, or other magnetic material, and the section 92 is provided with a pivoted latch 95 for engaging a keeper member 96 on the mold-section 91.

Each of the sections 91, 92 is formed with a work-receiving cavity, and when the mold sections are in mating relation, the complete cavity, designated 97, is circular in cross-section and annular in form, and adapted to receive and hold an inner tube 98 to be vulcanized. The cavity in the stationary mold section 91 is greater than semi-circular in cross-section, and the cavity in section 92 is less than semi-circular in cross-section, which condition is effected by having the meeting plane of the mold sections at the outer periphery of the cavity 97 substantially at the medial plane of the cavity, and the meeting plane of the sections at the inner periphery of the cavity substantially to one side thereof and in front of the medial plane of the cavity. The arrangement is such that the tube 98 is mounted in the cavity of the stationary section 91 by stretching it over or "buttoning" it on to the mold periphery constituting the inner wall of said cavity.

A radial aperture 99 is formed in the inner periphery of the mold section 91 to accommodate the valve-stem 98$^a$ of a tube 98 in the molding cavity 97. Fluid-pressure for distending the wall of the tube 98 to force it against the wall of the cavity 97 may be delivered through the valve-stem 98$^a$ from a flexible conductor pipe 98$^b$ extending from a suitable source of fluid pressure.

Each mold-section 91, 92 is formed with a recess behind the wall of its molding cavity and extending to the opposite face of the section. The recesses in the respective sections are transversely divided by annular plates 100, 101 of non-magnetic material such as brass to provide respective steam chambers or jackets 102, 103 in the mold members 91, 92, adjoining the walls of their molding cavities. The chambers 102, 103 are connected, near their tops, to respective flexible, fluid-inlet pipes 104, 105, and adjacent their lowest parts are connected to respective flexible fluid-outlet pipes 106, 107.

In the recesses defined by the peripheral walls of the mold-sections 91, 92 and the plates 100, 101 therein, outside the steam-chambers 102, 103, are mounted respective circumferential series of coil windings 108, 109, the ends 108$^a$, 109$^a$ extending through the walls of the mold sections and being connected to a source of electric current, as presently will be described. Annular plates 110, 111 of steel or other magnetic material are secured to the outer faces of the respective mold-sections to seal the coils 108, 109 within their recesses.

The electrical connections of the coils 108, 109 will readily be understood by reference to the wiring diagram, Fig. 11. As shown, the coils 108, 109 are connected, preferably in parallel, to a reversing switch 112 which includes a resistance coil 113, said switch being connected to a power line 114. The arrangement is such that in one position of the switch 112 current of substantial magnitude will flow through the coils 108, 109 and in the other position of the switch the current through said coils will be in reverse direction and greatly decreased magnitude.

In the operation of the modified apparatus of Figs. 9 and 10, the mold-sections being open and constantly heated by steam from the inlet pipes 104, 105, and the switch 112 being in neutral position, an inner-tube 98 is mounted in the cavity of the mold section 91 by "buttoning" it over the inner peripheral wall of said cavity. The swinging section 92 is then closed upon the tube, and the switch 112 thrown to the proper position to energize the coils 108, 109, with the result that magnetic flux is induced and flows through the walls of the mold-sections 91, 92 in a path indicated by the arrows in Fig. 10, the mold-sections thereby being firmly drawn together magnetically. The connection 98$^b$ is then attached to the valve-stem 98$^a$ and fluid pressure admitted to the interior of the tube 98 to distend its wall and force the same against the wall of the mold cavity in which it is enclosed.

Preferably before fluid pressure is admitted to the tube 98, the latch 95 is engaged in the keeper member 96, to prevent separation of the mold sections should the electric current for any reason be interrupted during the vulcanizing operation.

After vulcanization of the tube is completed, the fluid pressure connection 98$^b$ is removed from the valve stem 98$^a$, and the switch 112 is thrown to reverse position for a relatively brief interval to reverse the current flowing through the coils 108, 109 and to dissipate any residual magnetism therein. The mold may then be opened, the vulcanized article removed, and the operations described may be repeated.

By the use of my invention I eliminate the necessity of mechanical means for holding molds tightly closed during vulcanization, and consequently am able to make the mold walls correspondingly thinner with resulting advantages of lower cost and less weight. Economy also is effected in the time required for vulcanization since the thin walls of the molds are more quickly penetreated by heat, and are more quickly cooled, when cooling of the molds after vulcanization is desired.

The invention may be further modified within the scope of the appended claims, and I do not limit the claims to the exact procedure or the specific construction described.

I claim:

1. In apparatus of the character described, the combination of a sectional mold comprising mating mold sections, means within the mold sections for producing magnetic flux therein, means for feeding the mold in a course which extends through a vulcanizer, and means for energizing the flux-producing means at a determinate region of said course.

2. Apparatus as described in claim 1 including means for automatically discharging residual flux from the mold-sections at a different region of the mold's course.

3. In apparatus of the character described the combination of a sectional mold, means for magnetically holding together the sections thereof, means for delivering pressure fluid to an article within the mold, means for feeding the mold in a course which extends through a vulcanizer, and means for actuating the magnetic section-holding means and the pressure-fluid-delivering means selectively at determinate regions of the mold's course.

In witness whereof I have hereunto set my hand this 1st day of December, 1928.

ROBERT MAYNE.